United States Patent [19]
Fukumura

[11] Patent Number: 4,746,106
[45] Date of Patent: May 24, 1988

[54] CAR SUSPENSION SYSTEM
[75] Inventor: Takeo Fukumura, Yokohama, Japan
[73] Assignee: NHK Spring Co., Ltd., Yokohama, Japan
[21] Appl. No.: 27,797
[22] Filed: Mar. 19, 1987
[30] Foreign Application Priority Data Aug. 15, 1986 [JP] Japan .................. 61-191262
Aug. 15, 1986 [JP] Japan .................. 61-191263

[51] Int. Cl.4 .............. B60G 17/08; F16F 9/50
[52] U.S. Cl. .................... 267/218; 267/64.22; 280/707
[58] Field of Search .............. 188/299, 314, 319; 267/64.15, 64.16, 64.18, 64.19, 64.22, 64.25, 217, 218; 280/707

[56] References Cited

U.S. PATENT DOCUMENTS

| | | |
|---|---|---|
| 3,140,085 | 7/1964 | de Carbon . |
| 3,469,661 | 9/1969 | Hoffmann et al. . |
| 3,659,870 | 5/1972 | Okuyama . |
| 3,689,053 | 5/1972 | Wanner . |
| 3,720,405 | 3/1973 | Lohr . |
| 3,955,807 | 5/1976 | Takahashi et al. . |
| 4,052,088 | 10/1977 | Tyseley . |
| 4,159,756 | 7/1979 | Murakami et al. ............ 188/319 |
| 4,334,600 | 6/1982 | Palitto ............ 188/314 |
| 4,491,207 | 1/1985 | Boonchanta et al. ............ 188/299 |
| 4,515,253 | 5/1985 | Itoh ............ 188/314 |
| 4,527,676 | 7/1985 | Emura et al. ............ 188/299 |
| 4,555,126 | 11/1985 | Ishimitsu et al. ............ 280/707 |
| 4,635,906 | 1/1987 | Bump ............ 267/64.15 X |

FOREIGN PATENT DOCUMENTS

| | | |
|---|---|---|
| 55-65741 | 5/1980 | Japan . |
| 56-131409 | 10/1981 | Japan . |
| 56-149203 | 11/1981 | Japan . |
| 59-5447 | 2/1984 | Japan . |
| 59-73312 | 4/1984 | Japan . |
| 60-209309 | 10/1985 | Japan . |
| 1311646 | 3/1973 | United Kingdom . |
| 2135020A | 8/1984 | United Kingdom . |

Primary Examiner—Duane A. Reger
Attorney, Agent, or Firm—Frishauf, Holtz, Goodman & Woodward

[57] ABSTRACT

A suspension system according to the present invention comprises a cylinder piston mechanism and a sub-tank. A main gas chamber is defined inside the cylinder piston mechanism, while a sub-gas chamber is defined inside the sub-tank. An oil chamber, filled with oil, and an oil passage are arranged between the main and sub-gas chambers. The oil passage is opened and closed by means of a control valve, which has a rotating valve plug for controlling the oil flow. When the control valve is open, the main and sub-gas chambers change their respective capacities simultaneously as a rod reciprocates. When the valve is closed, only the main gas chamber changes its capacity as the rod reciprocates. The control valve is provided with a spring-constant changing orifice and a damping-force changing orifice, whereby the spring constant and damping force of the system are changed simultaneously, in accordance with the rotational position of the valve plug.

8 Claims, 4 Drawing Sheets

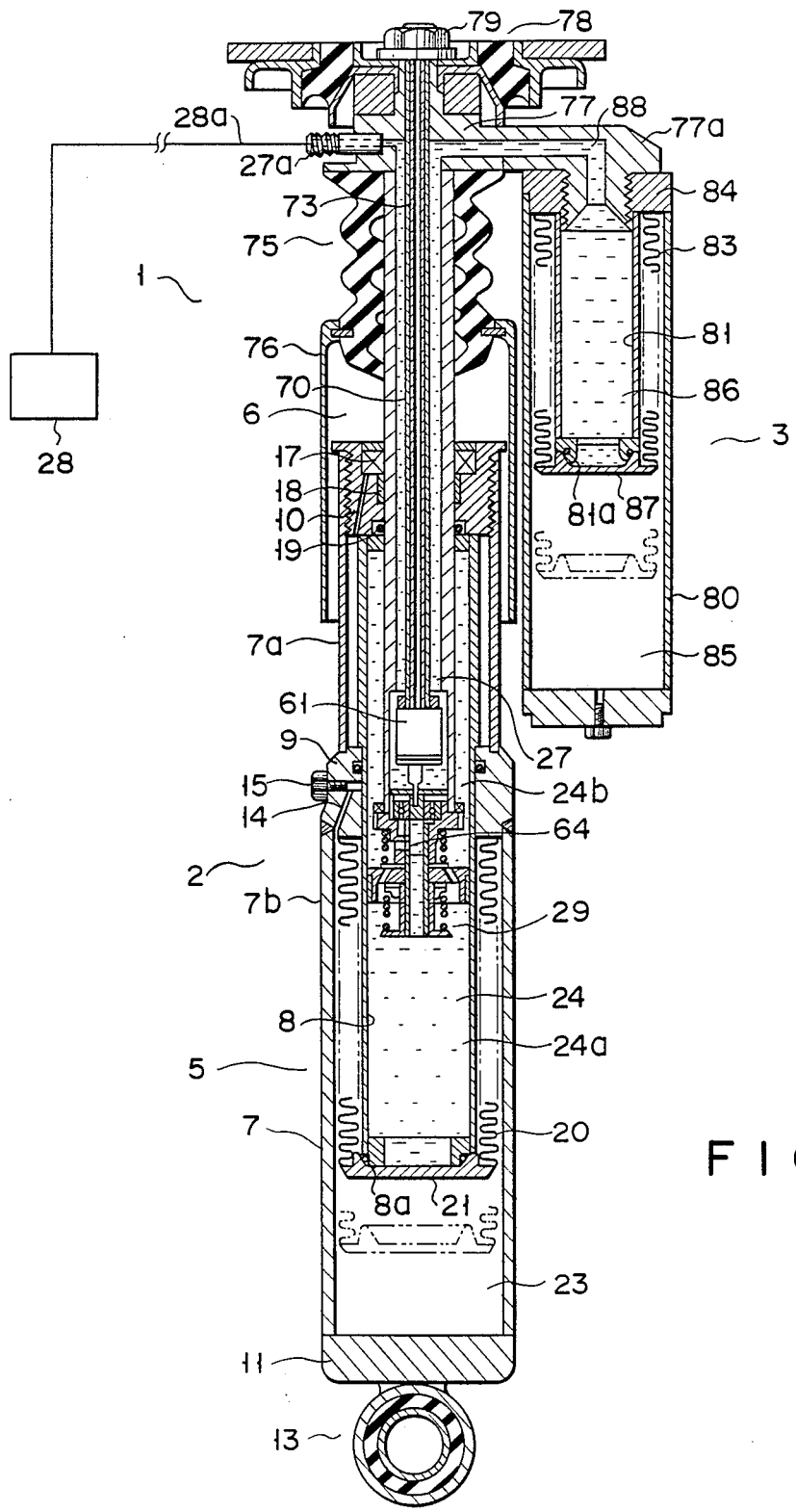
F I G. 1

F I G. 3A
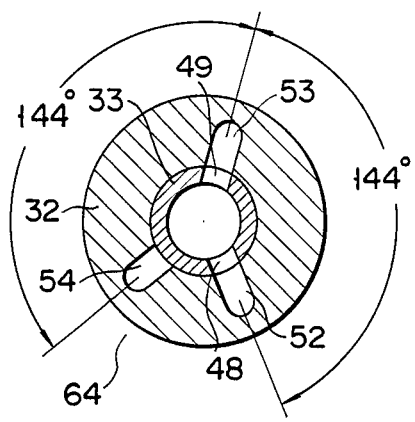
F I G. 3B
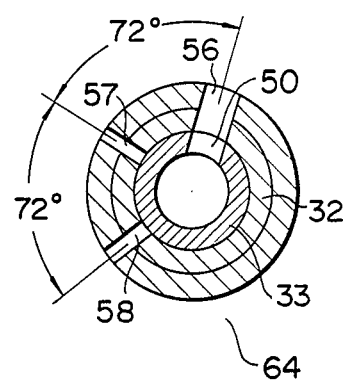
F I G. 4A
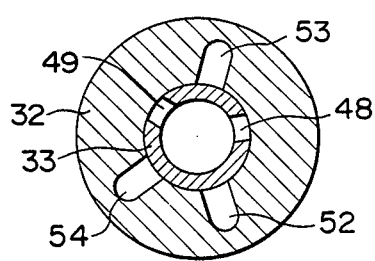
F I G. 4B
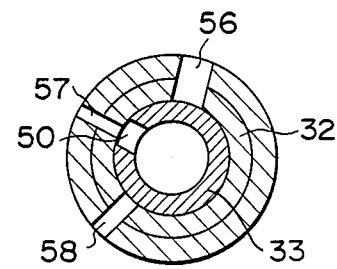
F I G. 5A
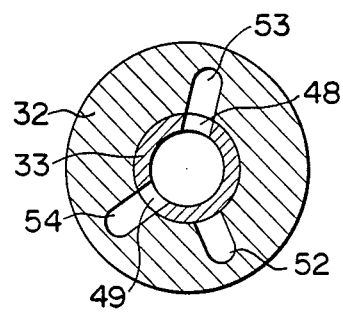
F I G. 5B
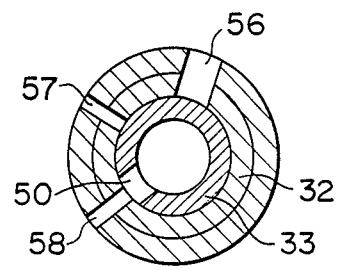

CAR SUSPENSION SYSTEM

BACKGROUND OF THE INVENTION

The present invention relates to a suspension system adapted to be arranged between members located on the body side and wheel side of an automobile, and more specifically, to the improvement of a car suspension system having an oil chamber and a gas chamber incorporated therein.

Prior art suspension systems, which are adapted to contain oil and gas, comprise a cylinder housing and a rod fitted therein. An oil chamber and a gas chamber are defined inside the cylinder housing. Compressed gas, such as nitrogen, is sealed in the gas chamber. The expansion and compression of the gas inside the cylinder housing enables this system to act as a gas-spring mechanism. Damping-force generating means is provided inside the cylinder housing. The oil in the oil chamber is subjected to viscous resistance as it passes through the generating means, with the result that reciprocation of the rod is damped.

Conventionally known are suspension systems in which a sub-tank is located outside the cylinder housing. A shock absorber for automobile, as disclosed in U.S. Pat. No. 4,159,756, comprises a cylinder body and a tank, each having a gas chamber therein. The respective gas chambers of the cylinder body and the tank are connected to each other by a through hole. This shock absorber cannot, however, change its spring constant.

Meanwhile, a car suspension system as disclosed in U.S. Pat. No. 4,555,126 comprises a plurality of gas chambers and accumulators. These gas chambers and accumulators are connected by means of an air passage, e.g., an air pipe. The air passage is provided with a solenoid-control valve for opening and closing the passage. The spring constant of this suspension system is low when the valve opens. When the valve closes, the spring constant is high. In the suspension system constructed in this manner, however, the valve must have a high-accuracy seat and plug, in order to ensure that the air passage is tightly sealed when the valve is closed. This is because, unless the valve plug is in tight contact with the valve seat when the valve is closed, are will flow through the air passage. In such a case, the spring constant tends to become unchangeable.

Moreover, a shock absorber as disclosed in U.S. Pat. No. 4,527,676 comprises a tubular member having a plurality of orifices of different sizes, and an orifice adjuster having a cutout. The cutout is formed so as to communicate with an orifice of a desired size when the orifice adjuster is rotated by means of a motor. The damping force of the shock absorber varies in accordance with the size of the orifice. In this U.S. patent, however, there is no description of any gas spring mechanism. Therefore, this conventional shock absorber cannot change its spring constant.

SUMMARY OF THE INVENTION

Accordingly, an object of the present invention is to provide a car suspension system which can reliably change its spring constant, when required. Another object of the invention is to provide a suspension system capable of changing its damping force and spring constant simultaneously.

In order to achieve the above objects of the present invention, a car suspension system is provided, which comprises a cylinder piston mechanism including at least one cylinder housing and a rod, the rod being fitted in the cylinder housing, for reciprocation in the axial direction thereof, the cylinder piston mechanism having therein a main gas chamber containing gas and a main oil chamber filled with oil, the main gas chamber changing its capacity as the rod reciprocates; a sub-tank disposed outside the cylinder piston mechanism, and having therein a sub-gas chamber containing gas and a sub-oil chamber filled with oil; oil-circulating means connecting the main and sub-oil chambers, so that the oil flows between the two oil chambers; damping-force generating means arranged inside the cylinder piston mechanism, and dividing the main oil chamber into first and second portions, the damping-force generating means having an orifice connecting the first and second portions, whereby the motion of the rod is damped by viscous resistance produced when the oil in the main oil chamber passes through the orifice; and a control valve attached to the oil-circulating means connecting the main and sub-oil chambers, the valve being adapted to connect the two oil chambers when open, and to isolate the oil chambers from each other when closed.

When, in the suspension system constructed in this manner, the rod is pushed into the cylinder housing, the gas in the main gas chamber is compressed. As a result, the capacity of the gas chamber is reduced, with the result that the recoiling force of the gas therein increases. When, on the other hand, the rod moves such that it extends out from the housing, the capacity of the main gas chamber consequently increases. If the control valve is open when the rod is reciprocating in this manner, oil flows between the main and sub-oil chambers, with the result that the respective capacities of the main and sub-gas chambers change simultaneously. If the valve is closed at this time, only the capacity of the main gas chamber changes. Therefore, the spring constant is relatively low when the control valve is open, and is relatively high when the valve is closed.

In the suspension system described above, oil is filled in the oil chamber provided between the main and sub-gas chambers. When the control valve is open, the oil can flow within the chamber. When the valve is closed, the oil can no longer flow therein. In this condition, the internal pressure of the main gas chamber cannot act on the sub-gas chamber.

The valve plug of the control valve has orifices for changing the spring constant and the damping force, individually. Therefore, when the plug is rotated by means of an actuator, the spring constant and the damping force change simultaneously. Thus, in comparison with a system using separate actuators for controlling its spring constant and damping force, the suspension system of the present invention enjoys a simpler construction, requires fewer components, and can change its spring constant and damping force more easily.

BRIEF DESCRIPTION OF THE DRAWINGS

FIG. 1 is a longitudinal sectional view of a suspension system according to a first embodiment of the present invention;

FIG. 3A is a sectional view taken along line A—A of FIG. 2;

FIG. 3B is a sectional view taken along line B—B of FIG. 2;

FIG. 4A is a sectional view similar to FIG. 3A, showing a state where a valve plug has been rotated to a second position;

FIG. 4B is a sectional view similar to FIG. 3B, showing a state where the valve plug has been rotated to the second position;

FIG. 5A is a sectional view similar to FIG. 3A, showing a state where the valve plug has been rotated to a third position;

FIG. 5B is a sectional view, similar to FIG. 3B, showing a state where the valve plug has been rotated to the third position.

DETAILED DESCRIPTION OF THE PREFERRED EMBODIMENTS

Figure 2:
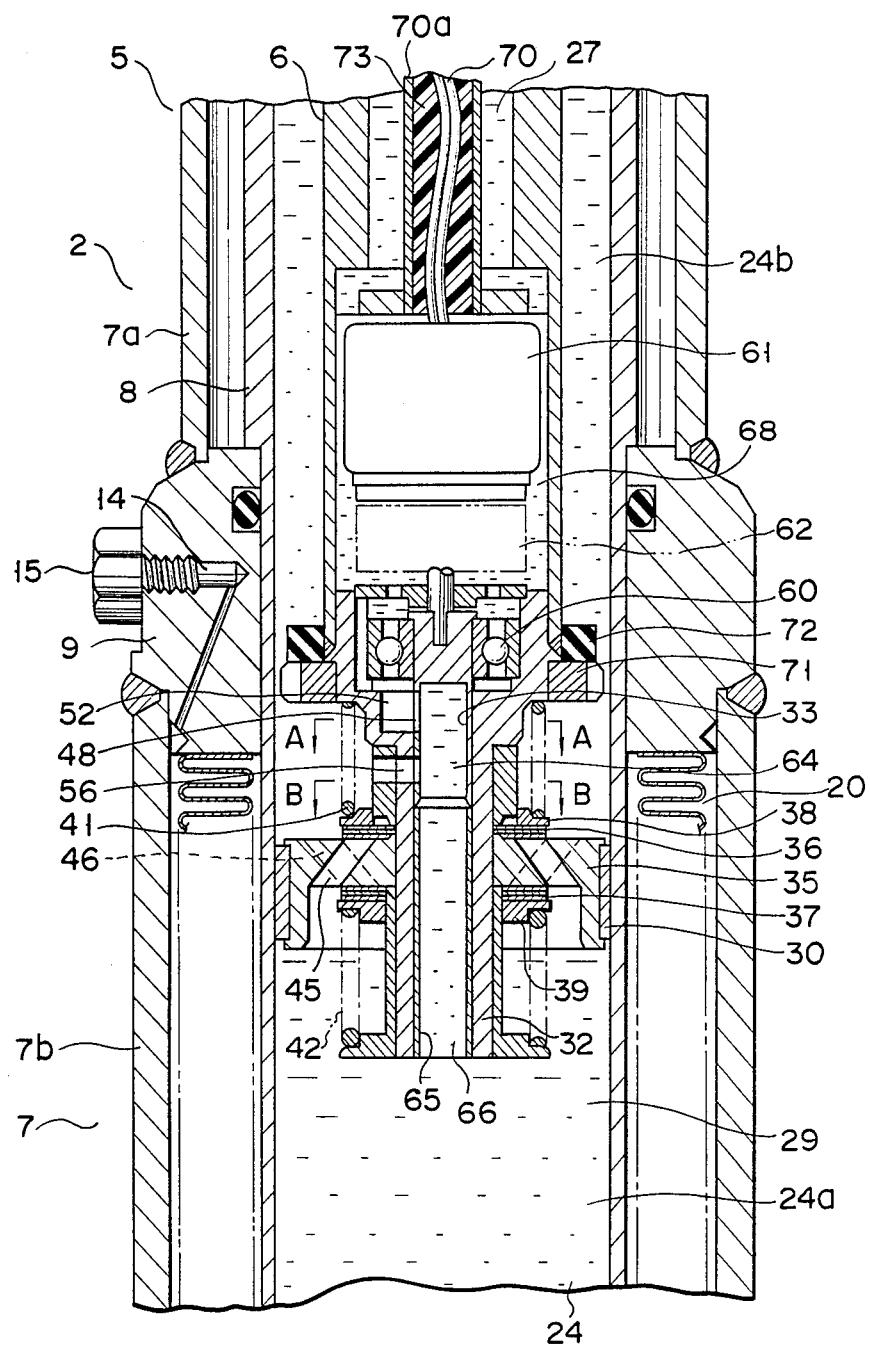
FIG. 2 is an enlarged sectional view of a damping-force generating mechanism shown in FIG. 1.

FIGS. 1 to 5B show a first embodiment of the present invention. As is shown in FIG. 1, car suspension system 1 comprises cylinder piston mechanism 2 and sub-tank 3. Mechanism 2 includes cylinder housing 5 and hollow rod 6. Rod 6 is fitted in housing 5, and can reciprocate along the axis thereof.

Cylinder housing 5 includes hollow outer cylinder 7, which is composed of cylindrical first member 7a and cylindrical second member 7b, and hollow inner cylinder 8 disposed inside cylinder 7. Inner cylinder 8 has open end 8a. First and second members 7a and 7b are coupled to each other by intermediate member 9. Lid 10 is fixed to the upper end of outer cylinder 7. It has a hole which is penetrated by rod 6. End plate 11 is attached to the lower end of cylinder 7. Coupling member 13 is fixed to plate 11. Member 13 is connected to a wheel-side member, such as a lower arm (not shown). Intermediate member 9 has gas-supply port 14, which is closed by plug 15. Low-pressure seal 17, sliding bearing 18, and high-pressure seal 19 are attached to lid 10.

Bellows 20 is housed in outer cylinder 7, and positioned coaxially with outer cylinder 7 and inner cylinder 8. It has a closed end and an open end, is formed of metal or synthetic resin. It can extend and contract in the axial direction of outer cylinder 7. Its open end is fixed to intermediate member 9, and its closed end is attached to bellows cap 21.

Main gas chamber 23 is defined between the inner surface of outer cylinder 7 and the outer wall surface of bellows 20. Compressed gas, e.g., nitrogen, is sealed in chamber 23. Main oil chamber 24 is defined inside bellows 20. The bellows extends or contracts, depending on the capacity of gas chamber 23. When bellows 20 contracts to a predetermined degree or more, the inner surface of bellows cap 21 comes into intimate contact with open end 8a of inner cylinder 8. When bellows 20 extends, cap 21 leaves end 8a.

Oil passage 27 extends through hollow rod 6 along the axis thereof. Oil-supply port 27a is formed at an end portion of passage 27. Oil pipe 28a of hydraulic unit 28 is connected to port 27a. Unit 28 includes an oil motor, for use as an oil-pressure source, a solenoid-controlled valve, an oil tank, etc.

Damping-force generating mechanism 29 is provided at the lower-end side of rod 6. It divides main oil chamber 24 between first portion 24a, situated on the lower side, and second portion 24b on the upper side. As shown in FIG. 2, mechanism 29 includes sliding bearing 30 which is in contact with the inner surface of inner cylinder 8. Mechanism 29 also includes hollow body 32, in which cylindrical valve plug 33 is contained for rotation. Piston 35 is fixed to the outside of body 32. Plate 36 and plate retainer 38 are arranged on the top side of piston 35, while plate 37 and plate retainer 39 are provided on the bottom side of the piston. Coil spring 41 presses retainer 38 against plate 36. Likewise, coil spring 42 presses retainer 39 against plate 37.

Piston 35 has orifices 45 and 46. Plate 36 faces an open end of orifice 45, and plate 37 faces that of orifice 46.

As shown in FIGS. 3A to 5B, valve plug 33 has spring-constant changing orifices 48 and 49 and damping-force changing orifice 50. As shown in FIG. 3A, orifices 48 and 49 form an angle of 144° between them. Body 32 has first holes 52, 53 and 54 which are situated so as to be able to face orifices 48 and 49. Holes 52, 53 and 54 communicate with oil passage 27 of hollow rod 6.

As shown in FIG. 3B, body 32 also has second holes 56, 57 and 58 of different sizes, which are situated so as to be able to face orifice 50. Holes 56, 57 and 58 communicate with second portion 24b of main oil chamber 24.

Valve plug 33 is rotatably supported on body 32 by ball bearing 60. It is rotated by one actuator 61, e.g., a stepping motor. Gear assembly 62 is arranged between actuator 61 and valve plug 33. Actuator 61 rotates plug 33 by 72° at a time. Body 32 and plug 33 constitute control valve 64 for controlling the oil flow.

Disposed inside body 32 is stopper 65 which is used to restrict the angle of rotation of valve plug 33. Stopper 65 prevents plug 33 from rotating clockwise from the position shown in FIG. 3A, and also from rotating counterclockwise from the position shown in FIG. 5A. Oil passage 66 penetrates stopper 65 vertically.

Actuator 61 is surrounded by oil passage 68 which connects oil passage 27 and first holes 52, 53 and 54. Conductor cable 70 of actuator 61 passes through pipe 70a, and its end portion is drawn out of rod 6. A gap between pipe 70a and cable 70 is filled up with plastic sealant 73. Rebound stopper 71, having rubber bumper 72, is attached to the upper portion of body 32.

Rubber bumper 75, cylindrical dust cover 76, and bracket 77 are attached to the upper portion of rod 6. Mount insulator 78 is fixed to the top side of bracket 77 by means of nut 79. Sub-tank 3 is attached to portion 77a of bracket 77, which protrudes horizontally.

Sub-tank 3 includes hollow outer cylinder 80, hollow inner cylinder 81 located inside cylinder 80, and bellows 83. Cylinders 80 and 81 and bellows 83 are coaxial with one another. An open end of bellows 83 is fixed to member 84. Sub-gas chamber 85 is defined between the inner surface of outer cylinder 80 and the outer wall surface of bellows 83. Sub-oil chamber 86 is defined inside bellows 83. Chamber 85 contains nitrogen gas. Bellows 83 extends or contracts, depending on the capacity of chamber 85. Bellows cap 87 is attached to a closed end of bellows 83. When bellows 83 contracts to a predetermined degree or more, the inner surface of bellows cap 87 comes into intimate contact with open end 81a of inner cylinder 81. When bellows 83 extends, cap 87 leaves end 81a. Oil passage 88 in bracket 77 connects oil passage 27 of rod 6 and sub-oil chamber 86.

The operation of suspension system 1, constructed in this manner, will now be described.

If rod 6 is pushed into cylinder housing 5, some of the oil in first portion 24a of main oil chamber 24 flows into second portion 24b of chamber 24 via orifice 45. As the oil flows through orifice 45 in this manner, the motion of rod 6 is damped by the viscous resistance of the oil. At the same time, the gas in main gas chamber 23 is compressed in accordance with the depth of depression of rod 6. If the capacity of chamber 23 is thus reduced, bellows 20 extends, and the repulsive force of the gas in chamber 23 increases.

If rod 6 moves in a direction such that it extends longer from cylinder housing 5, on the other hand, the oil in second portion 24b of main oil chamber 24 flows into first portion 24a via orifice 46. Also in this case, the motion of rod 6 is damped by the viscous resistance of the oil. At the same time, main gas chamber 23 increases its capacity, so that bellows 20 contracts.

When valve plug 33 is situated in its first position, as shown in FIGS. 3A and 3B, orifices 48 and 49 communicate with first holes 52 and 53, respectively. As a result, some of the oil in main oil chamber 24 flows through first holes 52 and 53 and oil passage 27 into sub-oil chamber 86 of sub-tank 3. The oil introduced into chamber 86 compresses sub-gas chamber 85. Thus, both gas chambers 23 and 85 are compressed simultaneously, so that the spring constant is lower than in a case such that only main gas chamber 23 is compressed. At the same time, orifice 50 connects with hole 56, which is the largest of second holes 56, 57 and 58. Accordingly, the oil in first portion 24a of main oil chamber 24 flows into second portion 24b via largest hole 56.

When valve plug 33 is rotated to its second position, as shown in FIGS. 4A and 4B, orifices 48 and 49 close. Therefore, the oil in main oil chamber 24 cannot flow into sub-oil chamber 86. In this case, only main gas chamber 23 changes its capacity, so that the spring constant becomes higher than in the case when both gas chambers 23 and 85 change their capacity simultaneously. Also, orifice 50 connects with hole 57, which is the smallest of second holes 56, 57 and 58. Accordingly, the oil in first portion 24a of main oil chamber 24 flows into second portion 24b via smallest hole 57, so that a maximum damping force is obtained.

When valve plug 33 is rotated to its third position, as shown in FIGS. 5A and 5B, orifices 48 and 49 connect with first holes 53 and 54, respectively. As a result, some of the oil in main oil chamber 24 flows through first holes 53 and 54 and oil passage 27 into sub-oil chamber 86 of sub-tank 3. Thus, both gas chambers 23 and 85 are compressed simultaneously, so that the spring constant is low. At the same time, orifice 50 connects with hole 58, which is intermediate in size between second holes 56 and 57. Accordingly, the damping force is larger than that obtained when orifice 50 connects with hole 56, and is smaller than that obtained when orifice 50 connects with hole 57.

In other words, when valve plug 33 is situated in the position of FIGS. 3A and 3B, the aforementioned gas spring mechanism is relatively soft, and its damping force is relatively small. In this state, suspension system 1 can fully absorb a shock which a running automobile receives from a rough road. When plug 33 is rotated to the position of FIGS. 4A and 4B, the gas spring mechanism becomes harder, and its damping force increases. In this state, system 1 can restrain the car body from tilting while the vehicle is turning or undergoing a sharp acceleration or deceleration. When plug 33 is situated in the position of FIGS. 5A and 5B, the gas spring mechanism is softer, and its damping force is moderate.

Actuator 61, which serves to rotate valve plug 33, can be controlled by means of a manual switch which is accessible to a driver in the driver's seat or cab of the automobile. Alternatively, the actuator may be controlled automatically, in response to output signals from sensors (not shown) for detecting the turning or acceleration of the automobile.

As is evident from the above description, the spring constant and damping force of suspension system 1 can be changed simultaneously by means of a single actuator 61. Thus, system 1 is simpler in construction and easier to control than the prior art suspension systems, whose spring constant and damping force are changed separately.

Moreover, main and sub-gas chambers 23 and 85 are isolated from each other by the oil in the oil chambers 24 and 86. The spring constant can be increased by closing control valve 64 so that the oil cannot flow between oil chambers 24 and 86. Since the viscous resistance of oil is much higher than that of gas, the oil flow can be prevented securely by closing valve 64. Thus, the spring constant is changed with high reliability.

Suspension system 1 of this embodiment can change the height of the car body. When oil is supplied to oil chambers 24 and 86 by hydraulic unit 28, rod 6 projects longer from cylinder housing 5, thereby increasing the body height. When the oil is withdrawn from chambers 24 and 86 by unit 28, on the other hand, the body is lowered.

Figure 6:
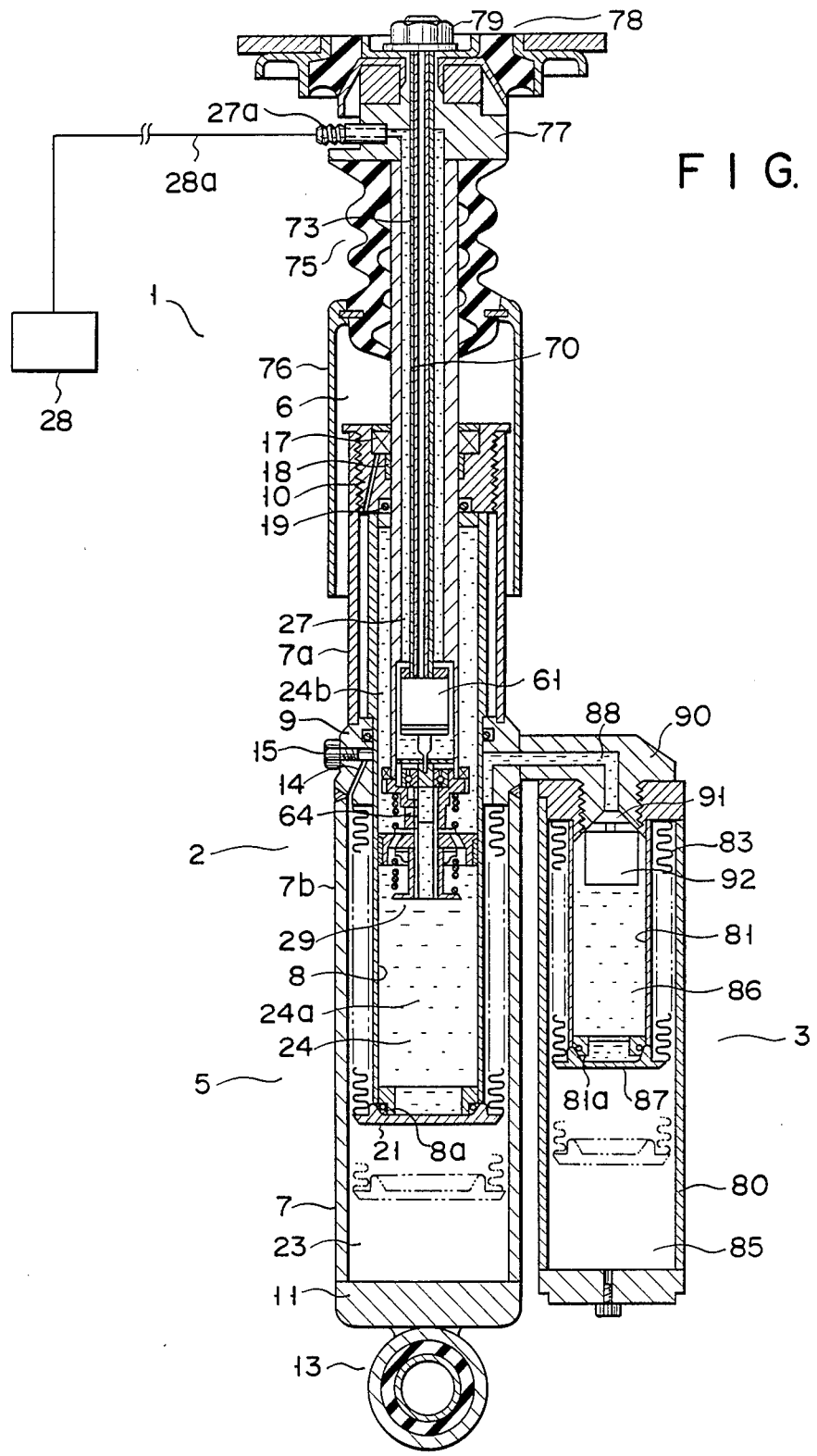
FIG. 6 is a longitudinal sectional view of a suspension system according to a second embodiment of the present invention.

FIG. 6 shows a second embodiment of the present invention. In suspension system 1 of this embodiment, sub-tank 3 is fixed to cylinder housing 5 by means of bracket 90. Oil passage 88, which is formed in bracket 90, connects main and sub-oil chambers 24 and 86. Valve 91 is provided at an end portion of passage 88. Valve 91 is driven by actuator 92, e.g., a solenoid, which is contained in tank 3. When valve 91 opens, oil chambers 24 and 86 communicate with each other by means of passage 88. As rod 6 reciprocates, therefore, two gas chambers 23 and 85 change their capacity simultaneously. When valve 91 closes, only main gas chamber 23 changes its capacity. Thus, the spring constant increases and decreases when valve 91 closes and opens, respectively. Like reference numerals are used to designate like or common portions of the first and second embodiments.

In the second embodiment, just as in the first embodiment, main gas chamber 23 is isolated from sub-gas chamber 85 by oil in oil chambers 24 and 86. When valve 91 closes, the oil is prevented from flowing through oil passage 88. Thus, the spring constant can be changed securely by opening or closing valve 91.

If two sub-tanks 3 are used, the spring constant can be changed in three steps. Alternatively, sub-tank 3 may be located off cylinder piston mechanism 2. In this case, the former is connected to the latter by means of an oil pipe. The suspension systems shown in FIGS. 1 and 6 may be mounted upside down so that rod 6 is situated below cylinder housing 5.

What is claimed is:
1. A car suspension system comprising:
 a cylinder piston mechanism including at least one cylinder housing and a rod, said rod being fitted in the cylinder housing, for reciprocation in the axial direction thereof, said cylinder piston mechanism having therein a main gas chamber containing gas and a main oil chamber filled with oil, said main gas chamber changing its capacity as the rod reciprocates;

a sub-tank located outside the cylinder piston mechanism, and having therein a sub-gas chamber containing gas and a sub-oil chamber filled with oil;

oil-circulating means connecting the main and sub-oil chambers, so that the oil flows between the two oil chambers;

damping-force generating means disposed inside the cylinder piston mechanism, and dividing the main oil chamber into first and second portions, said damping-force generating means having an orifice for connecting the first and second portions, whereby the motion of the rod is damped by viscous resistance produced when the oil in the main oil chamber passes through the orifice; and a control valve attached to the oil-circulating means connecting the main and sub-oil chambers, said valve being adapted to connect the two oil chambers when open, and to isolate the oil chambers from each other when closed.

2. The car suspension system according to claim 1, wherein said damping-force generating means includes a hollow body attached to an end portion of the rod, a cylindrical valve plug rotatably housed in the body, a piston in contact with the inner surface of the cylinder housing, and an actuator for rotating the valve plug, said body having at least one first hole for connecting the main and sub-oil chambers, and a plurality of second holes of different sizes for connecting the first and second portions of the main oil chamber, said valve plug having a spring-constant changing orifice and a damping-force changing orifice adapted to connect with the first hole and the second holes, respectively, when the valve plug is rotated through a predetermined angle.

3. The car suspension system according to claim 1, wherein said rod is hollow and has a bracket at an end portion thereof, said sub-tank being fixed to the bracket, and said rod and said bracket have an oil passage therein, so that the main and sub-oil chambers communicate with each other by means of the oil passage.

4. The car suspension system according to claim 1, further comprising a bellows disposed in the cylinder housing of the cylinder piston mechanism, and having an open end and a closed end, the wall of said bellows dividing the main oil chamber from the main gas chamber.

5. The car suspension system according to claim 1, further comprising a bellows disposed in the sub-tank, and having an open end and a closed end, the wall of said bellows dividing the sub-oil chamber from the sub-gas chamber.

6. The car suspension system according to claim 1, further comprising a hydraulic unit including an oil pipe for circulating the oil, said pipe being connected to the oil-circulating means.

7. The car suspension system according to claim 1, wherein said cylinder housing of the cylinder piston mechanism is provided with a bracket to which the sub-tank is fixed.

8. The car suspension system according to claim 7, wherein said bracket is provided with an oil passage connecting the main and sub-oil chambers, and said control valve and an actuator for driving the valve are contained in the sub-tank, said oil passage being opened and closed by means of the control valve.

* * * * *